US012674780B2

(12) United States Patent
Alhammad et al.

(10) Patent No.: US 12,674,780 B2
(45) Date of Patent: Jul. 7, 2026

(54) SYSTEM AND METHOD FOR AUTOMATED DETECTION, CLASSIFICATION, AND REMEDIATION OF DEFECTS USING ULTRASOUND TESTING

(71) Applicant: Saudi Arabian Oil Company, Dhahran (SA)

(72) Inventors: Bashaer Abdullah Alhammad, Jubail (SA); Hasan Ali Al-Hashmy, Dhahran (SA); Abdulaziz Yahya Asiri, Dammam (SA); Khalid Salem Al-Ghamdi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 604 days.

(21) Appl. No.: 18/047,118

(22) Filed: Oct. 17, 2022

(65) Prior Publication Data

US 2024/0125741 A1      Apr. 18, 2024

(51) Int. Cl.
*G01N 29/265* (2006.01)
*G01N 29/06* (2006.01)
*G01N 29/44* (2006.01)

(52) U.S. Cl.
CPC ......... *G01N 29/069* (2013.01); *G01N 29/265* (2013.01); *G01N 29/4445* (2013.01); *G01N 29/4481* (2013.01); *G01N 2291/0289* (2013.01)

(58) Field of Classification Search
CPC .............. G01N 29/069; G01N 29/265; G01N 29/4445; G01N 29/4481; G01N 2291/0289
See application file for complete search history.

(56) References Cited

U.S. PATENT DOCUMENTS

| | | | |
|---|---|---|---|
| 5,777,891 A | 7/1998 | Pagano et al. | |
| 6,456,899 B1 * | 9/2002 | Gleason ................ | G03F 7/7065 |
| | | | 706/900 |
| 6,523,411 B1 | 2/2003 | Mian et al. | |
| 9,864,931 B2 | 1/2018 | Kumar | |
| 9,976,967 B2 | 5/2018 | Bense et al. | |

(Continued)

FOREIGN PATENT DOCUMENTS

| | | | |
|---|---|---|---|
| CA | 3240184 A1 * | 6/2023 | ......... G01N 29/4472 |
| CN | 108573491 A | 9/2018 | |

(Continued)

OTHER PUBLICATIONS

Tsai, Du-Ming, and Po-Hao Jen. "Autoencoder-based anomaly detection for surface defect inspection." Advanced Engineering Informatics 48 (2021): 101272. (Year: 2021).*

(Continued)

*Primary Examiner* — Oneal R Mistry
*Assistant Examiner* — Rachel L Roberts
(74) *Attorney, Agent, or Firm* — Leason Ellis LLP

(57) ABSTRACT

A system and method perform automated detection, classification, and remediation of defects in a structure using ultrasound testing. The system includes an autoencoder is trained and configured to generate a de-noised UT scan image from a noisy UT scan image of a structure, a support vector machine configured to detect a defect in the structure, a convolutional neural network configured to classify the defect, and a remediation subsystem configured to remediate the defect. The method implements the system.

20 Claims, 5 Drawing Sheets

(56) References Cited

U.S. PATENT DOCUMENTS

| | | | |
|---|---|---|---|
| 10,811,151 | B2 | 10/2020 | Waite |
| 10,973,486 | B2 | 4/2021 | Sjostrand |
| 11,078,631 | B2 | 8/2021 | Gilbert |
| 11,200,456 | B2 | 12/2021 | Pinkovich |
| 12,237,873 | B2 * | 2/2025 | Cella ...................... H04B 17/26 |
| 2014/0216158 | A1 | 8/2014 | Sanabria Martin et al. |
| 2017/0262982 | A1 | 9/2017 | Pagoulatos et al. |
| 2018/0028153 | A1 | 2/2018 | Kuroiwa |
| 2018/0247227 | A1 | 8/2018 | Holtham |
| 2019/0015052 | A1 | 1/2019 | Scalzo et al. |
| 2019/0065884 | A1 | 2/2019 | Li |
| 2019/0261956 | A1 | 8/2019 | Srinivasan et al. |
| 2019/0323993 | A1 | 10/2019 | Mendes Rodrigues et al. |
| 2020/0160509 | A1 | 5/2020 | Pack |
| 2020/0226722 | A1 * | 7/2020 | Pandey ................. G06T 7/0004 |
| 2021/0056678 | A1 * | 2/2021 | Al Shehri ................ G06N 3/08 |
| 2021/0340857 | A1 | 11/2021 | Mohamed Shibly et al. |
| 2022/0018811 | A1 | 1/2022 | Al-Hashmy |
| 2022/0019190 | A1 * | 1/2022 | Mohamed Shibly ........................ G06F 18/214 |
| 2022/0207691 | A1 | 6/2022 | Kumar |
| 2022/0291175 | A1 * | 9/2022 | Chang .................... G06N 3/088 |
| 2022/0317095 | A1 * | 10/2022 | Oliphant ................ G01N 29/07 |
| 2022/0405887 | A1 * | 12/2022 | Alhammad ............... G06T 5/60 |
| 2023/0176015 | A1 * | 6/2023 | Fadhel ............... G01C 19/5712 73/579 |

FOREIGN PATENT DOCUMENTS

| | | | |
|---|---|---|---|
| CN | 108665456 | A | 10/2018 |
| KR | 20180117009 | A | 10/2018 |
| TW | M551477 | U | 11/2017 |
| WO | 2018140874 | A1 | 8/2018 |
| WO | 2019118613 | A1 | 6/2019 |

OTHER PUBLICATIONS

Saudi Arabia Examination Report mailed Jun. 25, 2025, for Application No. 123450583, with English translation. 20 pages.

Brattain, L.J., Telfer, B.A., Dhyani, M. (2018). Machine learning for medical ultrasound: status, methods, and future opportunities. Abdom Radiol. Volume 43, 786-799.

Jedrusiak, Mikel David. "A Deep Learning Approach for Denoising Air-Coupled Ultrasonic Responds Data." International Journal of Artificial Intelligence and Applications (IJAIA) 11.4 (2020).

Kaur, Prabhpreet et al., "A review of denoising medical images using machine learning approaches." Current medical imaging 14.5 (2018): 675-685.

Kondo, Ruho, et al. "Microstructure recognition using convolutional neural networks for prediction of ionic conductivity in ceramics." Acta Materialia 141 (2017): 29-38.

Ye, Jiaxing et al., "Computerized ultrasonic imaging inspection: From shallow to deep learning." Sensors 18.11 (2018): 3820.

LeCun, Yann, et al. "Gradient-based learning applied to document recognition." Proceedings of the IEEE 86.11 (1998): 2278-2324.

Lin, M., Chen, Q., & Yan, S. (2014). Network in network. 2nd International Conference on Learning Representations, ICLR.

Liu, Shengfeng, et al. "Deep learning in medical ultrasound analysis: a review." Engineering 5.2 (2019): 261-275.

Mocan, Ioana, et al. "Automatic Detection of Tumor Cells in Microscopic Images of Unstained Blood using Convolutional Neural Networks." 2018 IEEE 14th International Conference on Intelligent Computer Communication and Processing (ICCP). IEEE, 2018.

Munir, Nauman, et al. "Performance enhancement of convolutional neural network for ultrasonic flaw classification by adopting autoencoder." NDT & E International 111 (2020): 102218.

Shrifan, Nawaf et al., "Prospect of using artificial intelligence for microwave nondestructive testing technique: A review." IEEE Access 7 (2019): 110628-110650.

Fowler, Timothy, et al. "Inspecting FRP composite structures with nondestructive testing." Work 1 (1892).

Alhammad et al.; Pending U.S. Appl. No. 17/304,484, filed Jun. 22, 2021; 43 pages.

Ha et al.; Autoencoder-based detection of near-surface defects in ultrasonic testing; https://www.sciencedirect.com/science/article/pii/S0041624X21002547; Feb. 1, 2022; 10 pages.

Peng et al.; Detection method for surface scratches of composite automotive components with high reflection and complicated background color; Apr. 1, 2022; 11 pages.

LeCun, Yann, et al. "Object recognition with gradient-based learning." Shape, contour and grouping in computer vision. Springer, Berlin, Heidelberg, 1999. 319-345.

Yu, Houqiang, et al. "PCANet based nonlocal means method for speckle noise removal in ultrasound images." PloS one 13.10 (2018): e0205390.

Mohamadi, Sara et al., "Fusion and Visualization of Bridge Deck Nondestructive Evaluation Data via Machine Learning." Frontiers in Materials 7 (2020): 392.

Awasthi, Navchetan, et al. "Sinogram super-resolution and denoising convolutional neural network (SRCN) for limited data photoacoustic tomography." arXiv preprint arXiv:2001.06434 (2020).

Hendriksen, Allard Adriaan et al., "Noise2Inverse: Self-supervised deep convolutional denoising for tomography." IEEE Transactions on Computational Imaging 6 (2020): 1320-1335.

Koziarski, Michal et al. ,"Deep neural image denoising." International Conference on Computer Vision and Graphics. Springer, Cham, 2016.

Zhang, Ni, et al. "Skin cancer diagnosis based on optimized convolutional neural network." Artificial intelligence in medicine 102 (2020): 101756.

Wu, Jinlong et al.,. "Seeing permeability from images: fast prediction with convolutional neural networks." Science bulletin 63.18 (2018): 1215-1222.

Munir et al, Convolutional neural network for ultrasonic weldment flaw classification in noisy conditions, Ultrasonics, vol. 94, Apr. 2019, pp. 74-81 (Year: 2019).

S. Li, et al; "Ultrasonic Logging Image Denoising Based on CNN and Feature Attention," in IEEE Access, vol. 9, pp. 116845-116856, 2021, doi: 10.1109/ACCESS.2021.3106020. (Year: 2021).

Reza et al, Edge-preserving image denoising using a deep convolutional neural network, Signal Processing, vol. 159, Jun. 2019, pp. 20-32 (Year: 2019).

Virkkunen et al, Augmented Ultrasonic Data for Machine Learning, https://arxiv.org/abs/1903.11399, Mar. 26, 2019 (Year: 2019).

LeCun, Yann et al., "Deep learning." nature 521.7553 (2015): 436-444.

Kuo et al, Convolutional Autoencoders for Image Noise Reduction, https://towardsdatascience.com/ convolutional-autoencoders-for-image-noise-reduction-32fce9fc1763, Nov. 20, 2019 (Year: 2019).

* cited by examiner

SYSTEM AND METHOD FOR AUTOMATED DETECTION, CLASSIFICATION, AND REMEDIATION OF DEFECTS USING ULTRASOUND TESTING

CROSS-REFERENCE TO RELATED APPLICATIONS

This application is related to pending U.S. patent application Ser. No. 17/304,484, filed Jun. 22, 2021, which is incorporated herein by reference in its entirety.

FIELD OF THE DISCLOSURE

The present disclosure relates generally to ultrasound testing (UT), and, more particularly, to a system and method configured to perform automated detection, classification, and remediation of defects in a structure using UT.

BACKGROUND OF THE DISCLOSURE

Ultrasonic testing is an established method of non-invasive evaluation of structures, such as pipes in the oil and gas industry. Ultrasonic testing contributes to increased safety during inspections, with lower cost and higher speed of execution. However, when testing structures formed from composite materials, the use of lower quality polymers in such composite materials containing a large number of internal defects and voids results in significant ultrasonic signal attenuation. This attenuation typically renders ultrasonic images of composite parts noisy and incoherent. Accordingly, the use of ultrasonics as an inspection technique for composite structures has had limited effectiveness.

SUMMARY OF THE DISCLOSURE

According to an embodiment consistent with the present disclosure, a system and method perform automated detection, classification, and remediation of defects in a structure using UT. The system includes an autoencoder is trained and configured to generate a de-noised UT scan image from a noisy UT scan image of a structure, a support vector machine configured to detect a defect in the structure, a convolutional neural network configured to classify the defect, and a remediation subsystem configured to remediate the defect. The method implements the system.

In an embodiment, a system comprises an input device and a processor. The input device is configured to receive a noisy ultrasonic test (UT) scan image of a structure. The processor configured by code executing therein to implement a UT scan de-noiser, a defect detector, a defect classifier, and a remediation subsystem. The UT scan de-noiser is configured to generate a de-noised UT scan image from the noisy UT scan image. The defect detector is configured to detect a defect in the structure. The defect classifier is configured to classify the defect. The remediation subsystem is configured to remediate the classified defect.

The UT scan de-noiser includes an artificial neural network, which can be an autoencoder or a convolutional neural network (CNN). The artificial neural network is trained by an inputted training UT scan image. The trained artificial neural network de-noises the noisy UT scan image to generate the de-noised UT scan image. The defect detector includes a support vector machine (SVM). The defect classifier includes an artificial neural network, which can be a convolutional neural network (CNN). The defect is selected from the group consisting of: a strain in the structure, a crack in the structure, and a corrosion of the structure. The remediation subsystem remediates the defect by replacing a portion of the structure having the defect. Alternatively, the remediation subsystem remediates the defect by placing a covering sleeve over the defect.

In another embodiment, a system comprises an autoencoder, a support vector machine (SVM), a convolutional neural network (CNN), and a remediation subsystem. The autoencoder is configured to generate a de-noised UT scan image from a noisy UT scan image of a structure. The support vector machine (SVM) is configured to detect a defect in the structure. The convolutional neural network (CNN) is configured to classify the defect. The remediation subsystem is configured to remediate the classified defect.

The autoencoder is trained by an inputted training UT scan image. The trained autoencoder de-noises the noisy UT scan image to generate the de-noised UT scan image. The defect is selected from the group consisting of: a strain in the structure, a crack in the structure, and a corrosion of the structure. The remediation subsystem remediates the defect by replacing a portion of the structure having the defect. Alternatively, the remediation subsystem remediates the defect by placing a covering sleeve over the defect.

In a further embodiment, a method comprises training an autoencoder using a training UT scan image, applying an input noisy ultrasonic test (UT) scan image of a structure to the trained autoencoder, generating a de-noised UT scan image, applying the de-noised UT scan image to a support vector machine (SVM), detecting a defect in the structure, classifying the defect as to a type of defect using a convolutional neural network (CNN), and remediating the classified defect using a remediation subsystem. The defect is selected from the group consisting of: a strain in the structure, a crack in the structure, and a corrosion of the structure.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system 100 and method 500 configured to perform automated detection, classification, and remediation of defects in a structure using UT.

Figure 1:
FIG. 1 is a schematic of a system, according to an embodiment.
Figure 1:
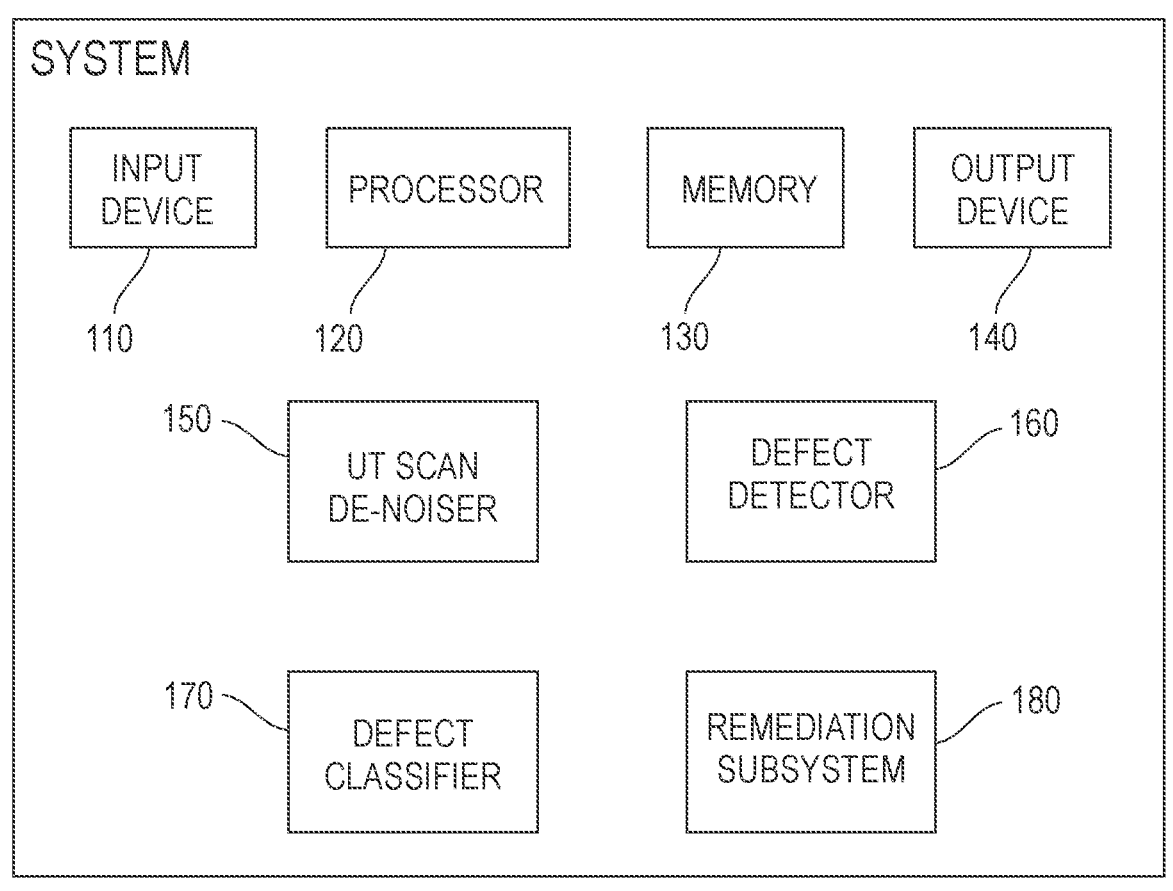

As shown in FIG. 1, the system 100 includes an input device 110, a processor 120, a memory 130, an output device 140, a UT scan de-noiser 150, a defect detector 160, a defect classifier 170, and a remediation subsystem 180. The input device 110 can include a communication interface configured to receive a UT scan image from a scanning device. For example, the scanning device can be an unmanned aerial vehicle (UAV) including a UT sensor. The UAV can fly to the structure, perch on the structure, and move along the structure to perform a UT scan of the structure using the UT sensor. The UAV then transmits the UT scan data as a UT scan signal to the input device 110. The structure can be a pipe, a slab, or other components used in a facility, such as a factory, a refinery, or a household. For example, the components can be used in the oil and gas industry. The structure can be composed of metal, a composite material, or other known materials.

The input device 110 can convey the UT scan signal to the processor 120. The processor 120 can format the UT scan signal into a data structure, such as a computer file. The data structure can be stored in the memory 130. The output device 140 can include a display to output the data structure as a UT scan image, such as the image 300 shown in FIG. 3. The UT scan de-noiser 150 processes the data structure to generate a de-noised image, such as the image 340 shown in FIG. 3. The image 340 is de-noised because it has reduced or no unwanted and, in general, unknown modifications that a signal may suffer during capture, storage, transmission, processing, or conversion. The defect detector 160 processes the de-noised image to determine whether the structure has a defect. If no defect is detected, the defect detector 160 can output a no-defect signal to the processor 120. The processor 120 can then instruct the output device 140 to generate a message to a user, such as the user 214 in FIG. 2. The message can be a notification indicating the absence of a defect in the structure.

However, if a defect is detected by the defect detector 160, the defect classifier 170 classifies the defect according to the type or nature of the defect. For example, the defect can be classified by the defect classifier 170 as a strain in the structure due to fatigue. If the structure is composed of a metal, such a strain can be metal fatigue. Alternatively, the defect can be classified by the defect classifier 170 as a crack in the structure. Still further, the defect can be classified by the defect classifier 170 as corrosion of the composition of the structure. The defect classifier 170 generates a classification signal indicating the type and location of the defect on the structure. The classification signal can be transmitted to the remediation subsystem 180 to remedy the defect.

Figure 2:
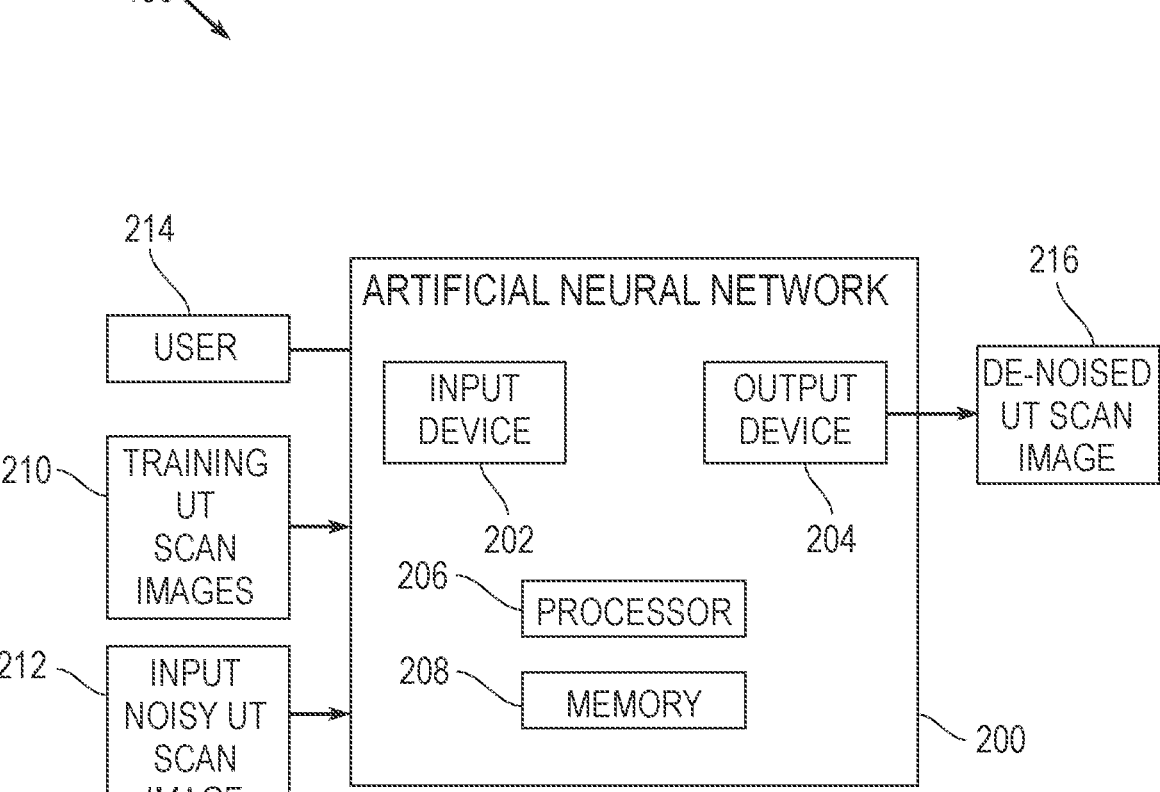
FIG. 2 is a schematic of a UT scan de-noiser, according to the embodiment.

Referring to FIG. 2, the UT scan de-noiser 150 includes an artificial neural network 200. The artificial neural network 200 includes an input device 202, an output device 204, a processor 206, and a memory 208. The input device 202 receives UT scan images, such as training UT scan images 210 and input noisy UT scan images 212. The UT scan images 210, 212 can be automatically received from the input device 110. Alternatively, the UT scan images 210, 212 can be input to the artificial neural network 200 under the control of a user 214. The processor 206 processes the UT scan images 210, 212 in conjunction with the memory 208 to generate a de-noised UT scan image 216 which is output from the output device 204. The memory 208 can maintain a plurality of nodes and a plurality of layers of the nodes to perform as an artificial neural network 200, with the data corresponding to the UT scan images 210, 212 applied to the nodes in the memory 208 under the control of the processor 206.

Prior to generation of the de-noised UT scan image 216 from the input noisy UT scan image 212, the artificial neural network 200 is trained by the training UT scan images 210. Under the control of the processor 206, the data correspond- ing to the training UT scan images 210 are repeatedly applied to the layers of nodes in the memory 208 to reconfigure the nodes to create the trained artificial neural network 200.

Figure 3:
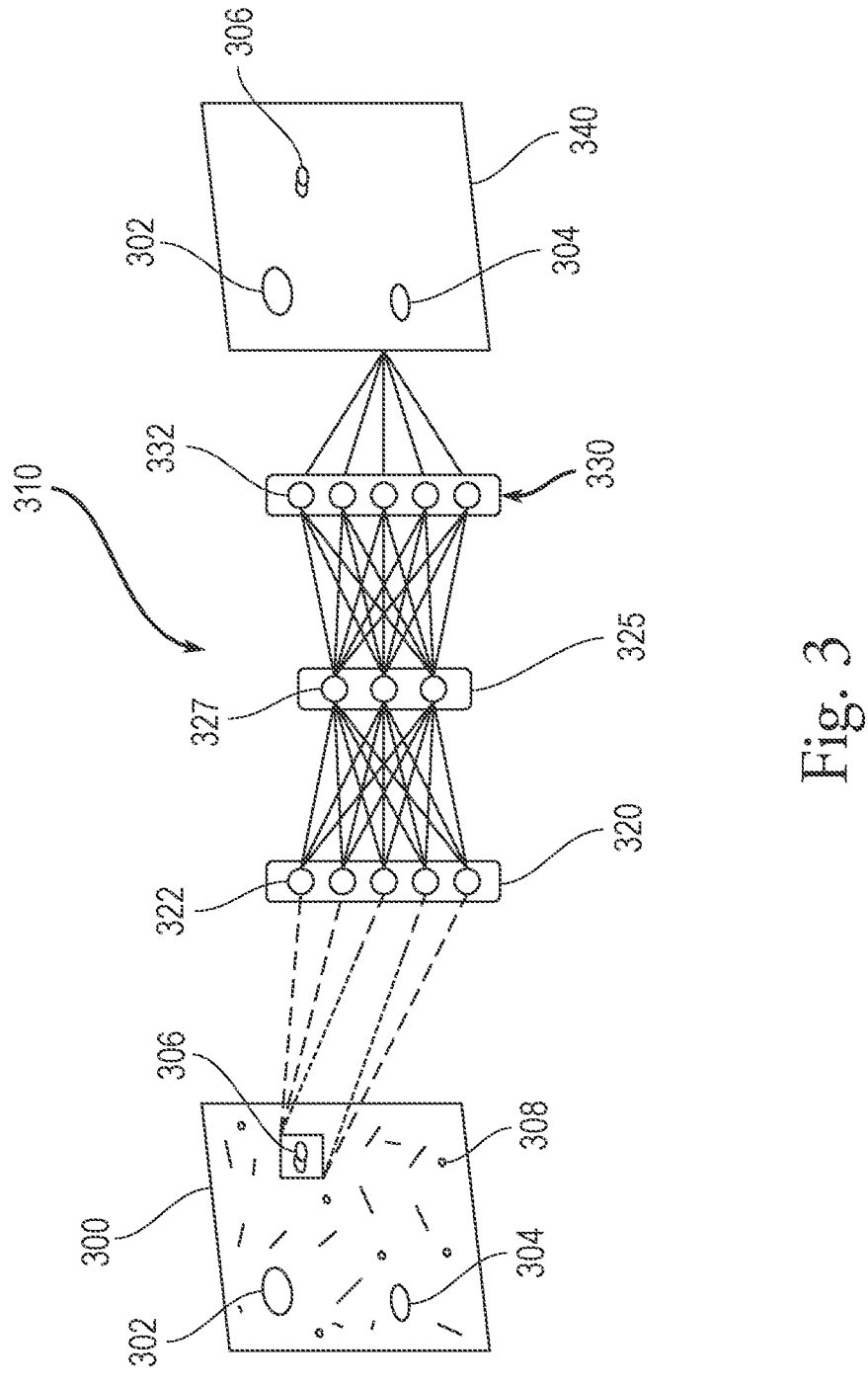
FIG. 3 illustrates de-noising of a UT scan using an autoencoder, according to the embodiment.

As described in greater detail in conjunction with FIG. 3, the artificial neural network 200 can be a trained autoen- coder configured to perform de-noising of the input noisy UT scan image 212 to generate the de-noised UT scan image 216. Alternatively, the artificial neural network 200 can be a trained convolutional neural network (CNN) have a struc- ture as described in conjunction with FIG. 4. The trained CNN is configured to perform de-noising of the input noisy UT scan image 212 to generate the de-noised UT scan image 216. Such de-noising by a trained CNN is described in U.S. patent application Ser. No. 17/304,484, filed Jun. 22, 2021, which is incorporated herein by reference in its entirety. In a further alternative embodiment, the UT scan de-noiser 150 in FIG. 1 can include a de-noising filter known in the art which is used instead of or in conjunction with the artificial neural network 200 shown in FIG. 2.

Referring to FIG. 3 in conjunction with FIG. 2, the de-noising of the input UT scan image 300 is performed by a trained autoencoder 310, which generates a de-noised UT scan image 340. The input UT scan image 300 includes features 302, 304, 306 as well as noise 308. The processor 206 is configured by code executing therein to collect the classified features 302, 304, 306 into the de-noised UT scan image 340, and to remove the noise 308. The de-noised UT scan image 340 is stored in the memory 208 as the image 216 for subsequent output by the output device 204.

The trained autoencoder 310 has an encoder 320, a bottleneck 325, and a decoder 330. Each of the encoder 320, the bottleneck 325, and the decoder 330 includes at least one layer of nodes 322, 327, 332, respectively. Each of the layers 320, 325, 330 can be implemented as hardware included in a processor. Alternatively, the layers 320, 325, 330 can be implemented as data structures in a memory of the proces- sor. In a further embodiment, the layers 320, 325, 330 can be implemented as data structures in a memory which are processed by the processor. For example, the processor is configured by code executing therein to implement each respective layer 320, 325, 330.

The encoder 320 is a layer of nodes which operate as artificial neurons. The layer of nodes of the encoder 320 compresses the input UT scan image 300 to an encoded representation in several orders of magnitude smaller than the input UT scan image 300. The encoder 320 is a set of conventional nodes 322 followed by pooling components which compress the input UT scan image 300 into the bottleneck 325. The bottleneck 325 is a compact layer of nodes, such as artificial neurons, which contains the com- pressed knowledge representation of the input UT scan image 300. The bottleneck 325 processes and restricts the flow of information to the decoder 330 from the encoder 320, such that the bottleneck 325 passes through only the most critical information of the input UT scan image 300. Accordingly, the significant features 302, 304, 306, in the input UT scan image 300 are passed through, while the noise 308 is filtered and not passed through the bottleneck 325.

The decoder 330 is a layer of nodes, such as artificial neurons, which decompresses the knowledge representa- tions of the features 302, 304, 36, and reconstructs the data back from its encoded form. The decoder 330 is a set of up-sampling and convolutional blocks that reconstructs the output of the bottleneck 325. The output 340 of the decoder 330 then is compared with the original input UT scan image 330 to measure the reconstruction loss.

Referring to FIG. 1, the defect detector 160 can include a support vector machine (SVM) configured to detect defects in the UT scanned structure from the de-noised UT scan image 216. The SVM can be implemented as hardware included in a processor. Alternatively, the SVM can be implemented as data structures in a memory of the processor. In a further embodiment, the SVM can be implemented as data structures in a memory which are processed by the processor. For example, the processor is configured by code executing therein to implement the SVM. As with the autoencoder 310, the SVM is trained by an initial training set of data which has a plurality of classes. Such classification is performed using diverse kernels, which a small set of numbers that are used as hyperplanes to separate and distinguish amongst the classes. The accuracy and precision of the SVM depends on the kernel used and defined boundary values. In the defect detector 160, to differentiate between a structure having a defect and a structure without a defect, a linear kernel is used by the SVM. The dataset representing the de-noised image 340 output from the autoencoder 310 is input to the SVM. The SVM is trained to differentiate the classes, so that, using the trained SVM, the defect detector 160 classifies the de-noised output 340 into two or more classes: a structure having a defect, and a structure without a defect. When a new image is input to the SVM, the SVM classifies the sample based on the training samples. Hence, SVM classifies the input de-noised image 340 as to whether the input de-noised image 340 belongs to the class of structures having a defect, or belongs to the class of structures without a defect. The defect detector 160 then generates and outputs a defect presence message indicating which class the de-noised image 340 belongs, that is, a defect is present or a defect is absent, with the output defect presence message associated with the classified image.

Figure 4:
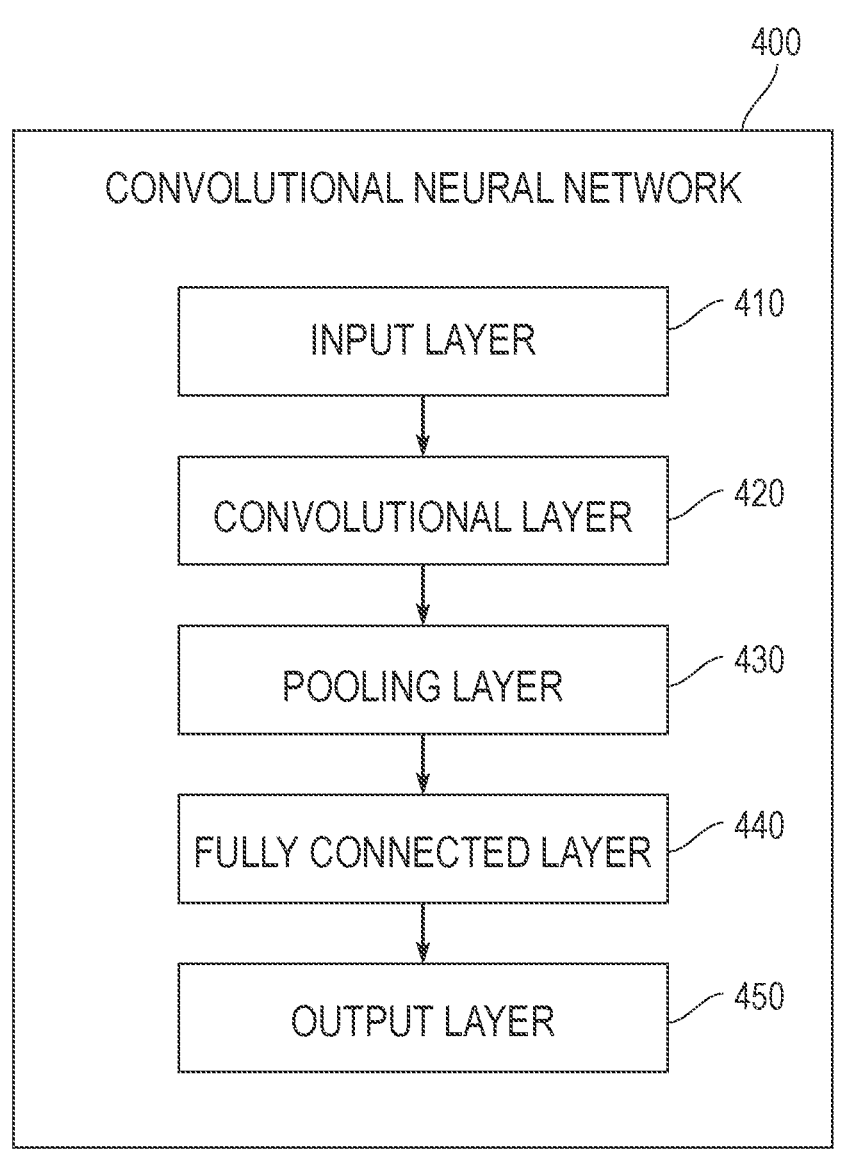
FIG. 4 illustrates a convolutional neural network, according to the embodiment.

Referring to FIGS. 1 and 4, the defect classifier 170 receives the defect message and the classified image from the defect detector 160. The defect classifier 170 can include a CNN 400 having an input layer 410, a convolutional layer 420, a pooling layer 430, a fully connected layer 440, and an output layer 450. The CNN 400 is configured to classify the type and location of any detected defect found by the defect detector 160. Each of the layers 410, 420, 430, 440, 450 can be implemented as hardware included in a processor. Alternatively, the layers 410, 420, 430, 440, 450 can be implemented as data structures in a memory of the processor. In a further embodiment, the layers 410, 420, 430, 440, 450 can be implemented as data structures in a memory which are processed by the processor. For example, the processor is configured by code executing therein to implement each respective layer 410, 420, 430, 440, 450. Referring to FIG. 4, the convolutional layer 420 includes a set of filters which are a type of linear operation applied over an input classified image, received from the input layer 410, to extract essential features corresponding to the type of defect. Learnable filters in the convolutional layer 420 search for edges and corners in the input classified image, while a small array of numbers called a kernel is applied across the input classified image. Each filter in the convolutional layer 420 is a hidden node in the next layer, which is the pooling layer 430 of the CNN 400.

The pooling layer 430 limits the size of the dataset of the image having a defect, which reduces the complexity of the computational procedures of the CNN 400. Additionally, the pooling layer 430 assists in avoiding data overfitting problems by reducing the size of parameters in which the pooling layer 430 selects vital information in the image to be classified by the type of defect. The fully connected layer 440 has a plurality of nodes which are fully connected to the nodes in the previous pooling layer 430. The fully connected layer 440 retains the labels for classification of the classified image, having a detected defect, which is received from the defect detector 160. The fully connected layer 440 is responsible for predicting the final output label associated with the input images. The fully connected layer 440 can utilize an activation function that returns an accurate prediction. In an example embodiment, an activation function called "SOFT-MAX" can return a prediction of the type of defect with the highest accuracy. The output layer 450 then generates and outputs a defect type message indicating the type of defect in the structure.

Referring back to FIG. 1, the output defect type message is output from the defect classifier 170 to the remediation subsystem 180. The remediation subsystem 180 can be implemented as hardware included in a processor. Alternatively, the remediation subsystem 180 can be implemented as data structures in a memory of the processor. In a further embodiment, the remediation subsystem 180 can be implemented as data structures in a memory which are processed by the processor. For example, the processor is configured by code executing therein to implement the remediation subsystem 180. The remediation subsystem 180 remediates the classified defect on the structure using a remediation technique appropriate to the type and location of the defect. For example, if the defect is a strain, the remediation subsystem 180 can replace a portion of the structure having the strain. If the structure is a pipe, the remediation subsystem 180 can replace the section of the pipe having the strain. Alternatively, the remediation subsystem 180 can cover the strain with a secondary structure. For example, if the structure is a pipe, the remediation subsystem 180 can place a covering sleeve over the section of the pipe having the strain. Accordingly, if the strain results in a break in the pipe, the covering sleeve prevents leakage from the pipe. Such actions as covering the strain or replacing the section portion of the structure having the strain are preventative remedies of the detected defect in the structure.

In another example, if the defect is a crack in the structure, the remediation subsystem 180 can replace a portion of the structure having the crack. If the structure is a pipe, the remediation subsystem 180 can replace the section of the pipe having the crack. Alternatively, the remediation subsystem 180 can cover the crack with a secondary structure. For example, if the structure is a pipe, the remediation subsystem 180 can place a covering sleeve over the section of the pipe having the crack. Accordingly, the covering sleeve prevents leakage from the pipe. Such actions as covering the crack or replacing the section portion of the structure having the crack are direct remedies of the detected defect in the structure.

In a further example, if the defect is corrosion of the structure, the remediation subsystem 180 can replace a portion of the structure having the corrosion. If the structure is a pipe, the remediation subsystem 180 can replace the section of the pipe having the corrosion. Alternatively, the remediation subsystem 180 can cover the corrosion with a secondary structure. For example, if the structure is a pipe, the remediation subsystem 180 can place a covering sleeve over the section of the pipe having the corrosion. Accordingly, the covering sleeve prevents leakage from the pipe. Such actions as covering the corrosion or replacing the section portion of the structure having the corrosion are preventative remedies of the detected defect in the structure.

In addition, the remediation subsystem 180 can be automated. For example, the remediation subsystem 180 can be a UAV configured to replace the portion of the structure with another structure, such as a new pipe replacing a section of the pipe having the defect. Alternatively, the remediation subsystem 180 can be a UAV configured to carry and install a covering sleeve on the portion of the structure having the defect.

Figure 5:
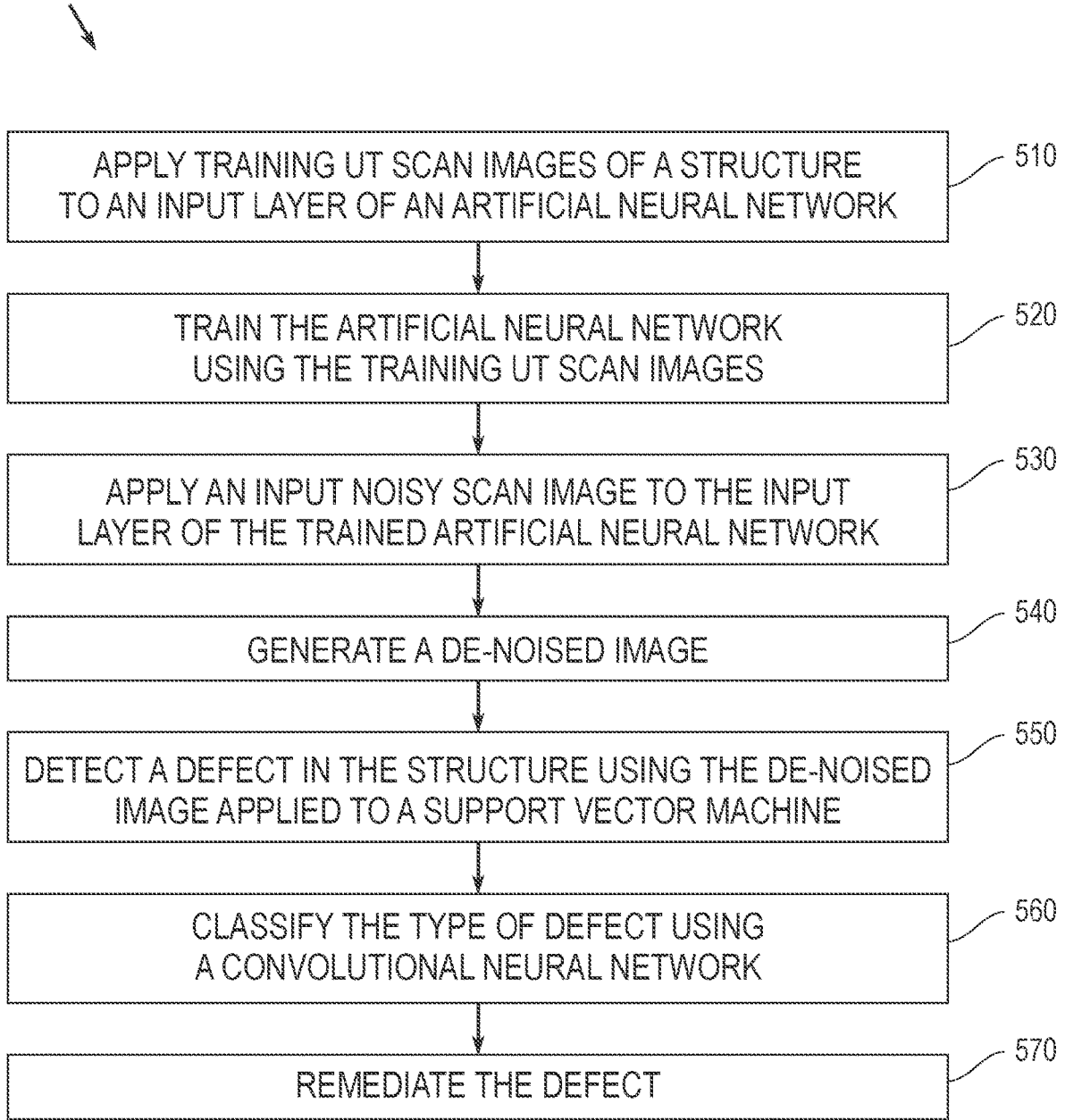
FIG. 5 is a flowchart of a method, according to the embodiment.

Referring to FIG. 5, a method 500 of operation of the system 100 includes the steps of applying the training UT scan images 210 of a structure under test to a UT scan de-noiser 150 shown in FIG. 1. The UT scan de-noiser 150 can be an artificial neural network 200, as shown in FIG. 2. The training UT scan images 210 are applied to an input layer of the artificial neural network 200 in step 510, training the artificial neural network 200 using the trained UT scan images in step 520, applying an input noisy UT scan image 212 to the input layer of the trained artificial neural network in step 530, and generating a de-noised image in step 540. As described above, the artificial neural network 200 can be an autoencoder 310 shown in FIG. 3, or can be a CNN 400 shown in FIG. 4.

The method 500 then detects a defect in the structure using the de-noised image applied to a defect detector 160 in step 550. The defect detector 160 can be an SVM. The method 500 then classifies the type of detect using a defect classifier 170 in step 560. The defect classifier 170 can be a CNN 400. The method 500 then remediates the defect in step 570 using the remediation subsystem 180. The steps 510-570 of the method 500 can be performed automatically by the components 150, 160, 170, 180 of the system 100.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system, comprising:

an input device configured to receive a noisy ultrasonic test (UT) scan image of a structure, wherein the noisy UT scan image includes noise and a plurality of features, and wherein the noisy UT scan image has a first size; and a processor configured by code executing therein to implement:

a UT scan de-noiser configured to generate a de-noised UT scan image from the noisy UT scan image, the UT scan de-noiser including:

an encoder having a first layer of artificial neurons to compress the noisy UT scan image to an encoded representation having a second size at least two orders of magnitude smaller than the first size;

a bottleneck having a second layer of artificial neurons, responsive to the encoded representation, to pass only the plurality of features as an output; and a decoder having a third layer of artificial neurons to decompress the output of the bottleneck and to generate the de-noised UT scan image from the decompressed output;

a defect detector configured to automatically determine, without user input, whether the structure has a defect or does not have a defect from the de-noised UT scan image;

a defect classifier configured, responsive to the automatic classification of the structure as having a defect, to classify the defect by type; and a remediation subsystem configured to remediate the classified defect.

2. The system of claim 1, wherein the UT scan de-noiser includes an artificial neural network.

3. The system of claim 2, wherein the artificial neural network is an autoencoder.

4. The system of claim 2, wherein the artificial neural network is a convolutional neural network (CNN).

5. The system of claim 2, wherein the artificial neural network is trained by an inputted training UT scan image.

6. The system of claim 5, wherein the trained artificial neural network de-noises the noisy UT scan image to generate the de-noised UT scan image.

7. The system of claim 1, wherein the defect detector includes a support vector machine (SVM).

8. The system of claim 1, wherein the defect classifier includes an artificial neural network.

9. The system of claim 8, wherein the artificial neural network includes a convolutional neural network (CNN).

10. The system of claim 1, wherein the defect is selected from the group consisting of: a strain in the structure, a crack in the structure, and a corrosion of the structure.

11. The system of claim 10, wherein the remediation subsystem remediates the defect by replacing a portion of the structure having the defect.

12. The system of claim 10, wherein the remediation subsystem remediates the defect by placing a covering sleeve over the defect.

13. A system, comprising:

an autoencoder configured to generate a de-noised UT scan image from a noisy UT scan image of a structure, wherein the noisy UT scan image includes noise and a plurality of features, and wherein the noisy UT scan image has a first size, the autoencoder including:

an encoder having a first layer of artificial neurons to compress the noisy UT scan image to an encoded representation having a second size at least two orders of magnitude smaller than the first size;

a bottleneck having a second layer of artificial neurons, responsive to the encoded representation, to pass only the plurality of features as an output; and a decoder having a third layer of artificial neurons to decompress the output of the bottleneck and to generate the de-noised UT scan image from the decompressed output;

a support vector machine (SVM) configured to automatically determine, without user input, whether the structure has a defect or does not have a defect from the de-noised UT scan image;

a convolutional neural network (CNN) configured, responsive to the automatic classification of the structure as having a defect, to classify the defect by type; and a remediation subsystem configured to remediate the classified defect.

14. The system of claim 13, wherein the autoencoder is trained by an inputted training UT scan image.

15. The system of claim 14, wherein the trained autoencoder de-noises the noisy UT scan image to generate the de-noised UT scan image.

16. The system of claim 13, wherein the defect is selected from the group consisting of: a strain in the structure, a crack in the structure, and a corrosion of the structure.

17. The system of claim 16, wherein the remediation subsystem remediates the defect by replacing a portion of the structure having the defect.

18. The system of claim 16, wherein the remediation subsystem remediates the defect by placing a covering sleeve over the defect.

19. A method, comprising:

training an autoencoder using a training UT scan image;

applying an input noisy ultrasonic test (UT) scan image of a structure to the trained autoencoder, wherein the noisy UT scan image includes noise and a plurality of features, and wherein the noisy UT scan image has a first size;

compressing the noisy UT scan image using an encoder having a first layer of artificial neurons to generate an encoded representation having a second size at least two orders of magnitude smaller than the first size;

responsive to the encoded representation, passing only the plurality of features as an output using a bottleneck having a second layer of artificial neurons;

decompressing the output of the bottleneck to generate a de-noised UT scan image using a decoder having a third layer of artificial neurons;

applying the de-noised UT scan image to a support vector machine (SVM);

automatically determining by the SVM, without user input, whether the structure has a defect or does not have a defect from the de-noised UT scan image;

responsive to the automatic classification of the structure as having a defect, classifying the defect as to a type of defect using a convolutional neural network (CNN); and remediating the classified defect using a remediation subsystem.

20. The method of claim 19, wherein the defect is selected from the group consisting of: a strain in the structure, a crack in the structure, and a corrosion of the structure.

* * * * *